W. JONES.
Shutter-Worker.
No. 8,756. Reissued June 17, 1879.
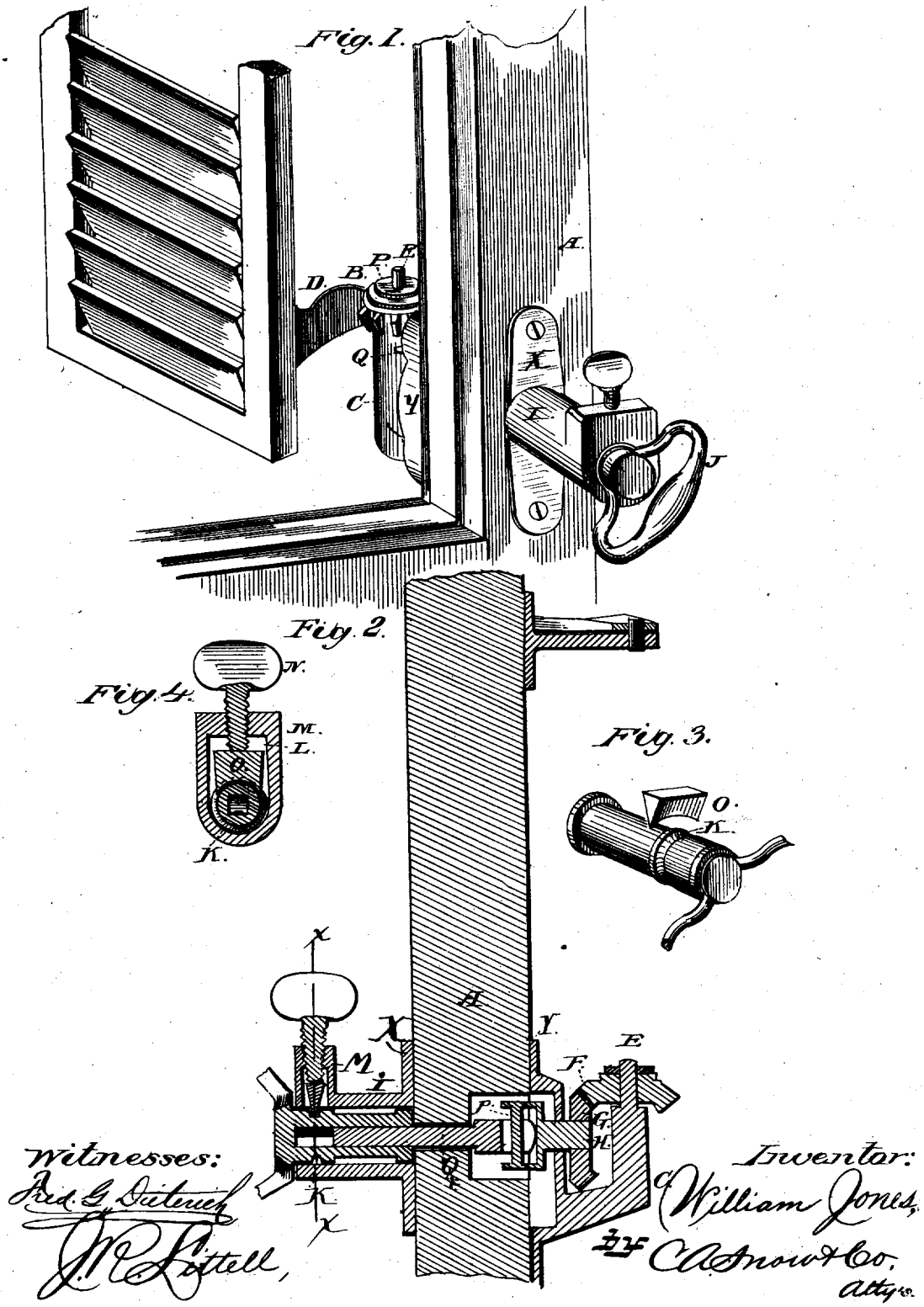
N. PETERS, PHOTO-LITHOGRAPHER, WASHINGTON, D. C.

UNITED STATES PATENT OFFICE.

WILLIAM JONES, OF OSHAWA, ONTARIO, CANADA.

IMPROVEMENT IN SHUTTER-WORKERS.

Specification forming part of Letters Patent No. 209,055, dated October 15, 1878; Reissue No. 8,756, dated June 17, 1879; application filed May 14, 1879.

*To all whom it may concern:*

Be it known that I, WILLIAM JONES, of Oshawa, Ontario, Canada, have invented certain new and useful Improvements in Shutter-Workers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1 represents a view, in perspective, of a shutter-worker embodying the improvements of my invention. Fig. 2 is a vertical longitudinal section, showing the handle and the mechanism for connecting with the shaft in the socket. Fig. 3 is a detached view of the handle and the key which binds it in its socket; and Fig. 4 is a section on the line *x x*, Fig. 2.

This invention relates to shutter-workers; and consists in the improvements in the construction of the same, hereinafter fully described, and particularly pointed out in the claims.

In the accompanying drawings similar letters of reference indicate corresponding parts in the several figures.

A represents the window-frame, that is built in the wall of the building, and in brick buildings or others where the walls are unusually thick it inclines, being narrower upon the outside of the wall than upon the inside thereof. B is the hinge, one part, C, of which carries the pintle E. The eye part D is provided with a gear-wheel, F, which engages with a gear-wheel, G, upon the shaft H.

The shaft H is connected by a universal joint, P, to a shaft, Q, which is passed through a hole made in the frame A, as shown. A socket, I, which receives the inner end of the shaft Q, and also the shaft of the handle J, is secured to the inner side of the frame A.

Where the casing and frame A are made flaring, as before mentioned, the castings X and Y are not in line with each other, and a single straight shaft passed through the window-frame would be inoperative. For this reason the universal joint P is provided, which will permit the shaft Q to operate the shaft H, even when the shaft Q is at a considerable incline.

The handle J has a groove, K, in its shaft near the hand-piece, and a recess, L, in the projection M, which holds the thumb-screw N, is adapted to receive a key, O, upon which the thumb-screw N acts to cause it to bind the shaft of the handle J.

To insert the handle J into the socket I, it is necessary to invert the casting before securing it to the window-frame, and unscrew the thumb-screw N, which will permit the key O to drop into recess L, at which time the handle J may be slipped upon the shaft Q in the socket I, and the casting X turned back to place and secured to the window-frame. The key O will then drop into the groove K, and the set-screw N may be turned to bind it at pleasure.

It will be observed that the handle J, being recessed to receive the end of shaft Q, and said shaft and recess being polygonal in cross-section, as shown in Fig. 4, the same set of fixtures may be readily adapted to window-casings of varying width, because the shaft may slide into or out of the recess without being disconnected from the handle. By turning the handle J the gear-wheels F and G will operate the hinge B, and the shutter may be opened or closed or locked in any position.

Having thus described my invention, what I claim as new and useful, and desire to secure by Letters Patent of the United States, is—

1. In a shutter-worker constructed and operating substantially as described, the combination, with a detachable handle adjustable upon the operating-shaft, of a key working in an annular groove in said handle, for the purpose of securing it in its socket, as set forth.

2. In a shutter-worker constructed and operating substantially as described, the combination, with a detachable handle adjustable upon the operating-shaft, of a key working in an annular groove in said handle, for the purpose of securing it in its socket, and a thumb-screw by which the said key may be forced against the said handle, so as to secure it in any desired position, as set forth.

3. The improved shutter-worker herein described, consisting of an operating-shaft made in two pieces, connected by a universal joint, a handle adjustable upon said operating-shaft, a key for retaining the said handle in its socket, a thumb-screw by which the said key may be forced against the handle to secure it in position, and suitable operating-gearing, as set forth.

In testimony that I claim the foregoing I have hereunto set my hand this 7th day of May, 1879.

WILLIAM JONES.

Witnesses:
L. K. MURTON,
WM. DICKIE.